United States Patent
Su et al.

(10) Patent No.: US 11,128,423 B2
(45) Date of Patent: Sep. 21, 2021

(54) BEAM FORMING AND TRANSMISSION METHOD AND NETWORK DEVICE

(71) Applicant: China Academy of Telecommunications Technology, Beijing (CN)

(72) Inventors: Xin Su, Beijing (CN); Qiubin Gao, Beijing (CN); Tamrakar Rakesh, Beijing (CN); Runhua Chen, Beijing (CN); Hui Li, Beijing (CN); Chuanjun Li, Beijing (CN); Qiuping Huang, Beijing (CN); Mengjun Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/477,135

(22) PCT Filed: Feb. 2, 2018

(86) PCT No.: PCT/CN2018/075138
§ 371 (c)(1),
(2) Date: Jul. 10, 2019

(87) PCT Pub. No.: WO2018/130233
PCT Pub. Date: Jul. 19, 2018

(65) Prior Publication Data
US 2019/0363844 A1    Nov. 28, 2019

(30) Foreign Application Priority Data

Jan. 10, 2017   (CN) .......................... 201710018475.7

(51) Int. Cl.
*H04B 7/0456* (2017.01)
*H04B 7/06* (2006.01)
(Continued)

(52) U.S. Cl.
CPC .......... *H04L 5/005* (2013.01); *H04B 7/0456* (2013.01); *H04B 7/0617* (2013.01); *H04B 7/086* (2013.01);
(Continued)

(58) Field of Classification Search
CPC .... H04B 7/02–12; H04J 11/0023–0093; H04J 2011/0003–0096;
(Continued)

(56) References Cited

U.S. PATENT DOCUMENTS

| | | | |
|---|---|---|---|
| 2015/0280876 A1* | 10/2015 | You | ...................... H04L 5/0048 |
| 2015/0373694 A1* | 12/2015 | You | ...................... H04L 5/0048 |
| 2018/0145809 A1* | 5/2018 | Kwak | ................... H04L 5/0094 |

FOREIGN PATENT DOCUMENTS

| | | |
|---|---|---|
| CN | 102307081 | 1/2012 |
| CN | 102860070 A | 1/2013 |

(Continued)

*Primary Examiner* — Timothy J Weidner
(74) *Attorney, Agent, or Firm* — Foley & Lardner LLP

(57) ABSTRACT

Disclosed are a beam forming and transmission method and a network device, for resolving the defects of limited flexibility and performance in prior art methods for improving the quality of channel estimation. The method comprises: a network side determining the configuration information of physical resource block (PRB) bundling parameters, the time domain configuration information of the configuration information of said PRB bundling parameters being configurable; the network side sending the configuration information of the PRB bundling parameters to a terminal so that after having received the configuration information of the PRB bundling parameters, the terminal uses a precoding mode corresponding to the configuration information of the PRB bundling parameters to perform channel estimation and demodulation.

18 Claims, 1 Drawing Sheet

---

101 determining by the network side configuration information of a PRB bundling parameter, where time-domain configuration information among the configuration information of the PRB bundling parameter is configurable

102 transmitting by the network side the configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter

(51) Int. Cl.
  *H04B 7/08* (2006.01)
  *H04L 5/00* (2006.01)
  *H04L 25/02* (2006.01)
  *H04W 8/24* (2009.01)
  *H04W 24/10* (2009.01)
  *H04W 72/04* (2009.01)
  *H04W 88/02* (2009.01)
  *H04W 88/08* (2009.01)
  *H04W 88/12* (2009.01)
  *H04W 92/10* (2009.01)

(52) U.S. Cl.
  CPC .......... *H04L 5/0092* (2013.01); *H04L 5/0094* (2013.01); *H04L 25/0202* (2013.01); *H04W 8/245* (2013.01); *H04W 24/10* (2013.01); *H04W 72/042* (2013.01); *H04W 72/046* (2013.01); *H04W 72/0446* (2013.01); *H04W 72/0453* (2013.01); *H04W 88/02* (2013.01); *H04W 88/08* (2013.01); *H04W 88/12* (2013.01); *H04W 92/10* (2013.01)

(58) Field of Classification Search
  CPC ..... H04L 5/0001–0098; H04L 25/0202–0258; H04W 8/22–245; H04W 24/02–10; H04W 48/02–20; H04W 72/005–14; H04W 74/002–008; H04W 88/02; H04W 88/04–12; H04W 92/04; H04W 92/10
  See application file for complete search history.

(56) References Cited

FOREIGN PATENT DOCUMENTS

| | | |
|---|---|---|
| CN | 104798329 A | 7/2015 |
| CN | 105379146 A | 3/2016 |
| CN | 106059702 | 10/2016 |
| WO | WO-2014/126573 A1 | 8/2014 |

\* cited by examiner

BEAM FORMING AND TRANSMISSION METHOD AND NETWORK DEVICE

This application is a National Stage of International Application No. PCT/CN2018/075138, filed on Feb. 2, 2018, which claims the benefit of Chinese Patent Application No. 201710018475.7, filed with the Chinese Patent Office on Jan. 10, 2017, and entitled "A method for transmitting beam-forming, and a network device", both of which are hereby incorporated by reference in their entireties.

FIELD

The present invention relates to the field of communications, and particularly to a method for transmitting beam-forming, and a network device.

BACKGROUND

As the sciences and technologies are advancing constantly, the Long Term Evolution (LTE) and other radio access technologies have been widely applied.

In the existing LTE system, in order to improve the quality of channel estimation, Physical Resource Block (PRB) bundling is generally applied so that pre-coding of a signal will not suddenly vary across several consecutive PRBs. In an implementation, the network side firstly determines the size of a Pre-coding Resource Block Group (PRB) according to a system bandwidth, and then configures a frequency-domain parameter of PRB bundling according to the determined PRG, so that a user equipment applies the same pre-coding to several consecutive PRBs in the frequency domain (the number of which is determined by the size of a PRG in the frequency domain) in channel estimation and demodulation.

However, when the quality of channel estimation is improved as described above, the flexibility and the performance may still be greatly limited. Accordingly it is highly desirable at present to further improve the quality of channel estimation.

SUMMARY

Embodiments of the invention provide a beam forming and transmission method and a network device so as to address the drawback in the prior art that when the quality of channel estimation is improved, the flexibility and the performance may be limited, for the technical effect of further improving the quality of channel estimation.

Particular technical solutions according to the embodiments of the invention are as follows.

In a first aspect, an embodiment of the invention provides a beam forming and transmission method including:

determining, by the network side, configuration information of a Physical Resource Block (PRB) bundling parameter, wherein time-domain configuration information among the configuration information of the PRB bundling parameter is configurable; and transmitting, by the network side, the configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter.

In a possible implementation, determining, by the network side, the configuration information of the PRB bundling parameter includes:

determining, by the network side, the configuration information of the PRB bundling parameter according to a system parameter; or determining, by the network side, the configuration information of the PRB bundling parameter according to a Demodulation Reference Signal (DMRS) parameter; or determining, by the network side, the configuration information of the PRB bundling parameter according to configuration indication information.

In a possible implementation, determining, by the network side, the configuration information of the PRB bundling parameter according to the system parameter includes:

determining, by the network side, the configuration information of the PRB bundling parameter according to a system bandwidth; or determining, by the network side, the configuration information of the PRB bundling parameter according to recommendation information transmitted by the terminal, wherein the recommendation information is generated by the terminal according to a channel measurement; or determining, by the network side, the configuration information of the PRB bundling parameter according to a preset threshold.

In a possible implementation, the configuration information of the PRB bundling parameter includes at least one of followings:

a size of a Pre-coding Resource block Group (PRG) in the frequency domain;

a size of a PRG in the time domain; or a size of a PRG in the time-frequency domain.

In a possible implementation, determining, by the network side, the configuration information of the PRB bundling parameter according to the DMRS parameter includes:

configuring, by the network side, the DMRS parameter; and determining, by the network side, the configuration information of the PRB bundling parameter corresponding to the DMRS parameter according to a preset correspondence relationship between the DMRS parameter and the PRB bundling parameter.

In a possible implementation, configuring, by the network side, the DMRS parameter includes at least one of followings:

determining, by the network side, the DMRS parameter according to the system bandwidth;

determining, by the network side, the DMRS parameter according to recommendation information transmitted by the terminal, wherein the recommendation information is generated by the terminal according to a channel measurement; or determining, by the network side, the DMRS parameter according to a preset threshold.

In a possible implementation, determining the configuration information of the PRB bundling parameter corresponding to the DMRS parameter includes at least one of followings:

determining time-domain configuration information of the PRB bundling parameter according to the DMRS parameter;

determining frequency-domain configuration information of the PRB bundling parameter according to the DMRS parameter; or determining time-frequency-domain configuration information of the PRB bundling parameter according to the DMRS parameter.

In a possible implementation, determining, by the network side, the configuration information of the PRB bundling parameter according to the configuration indication information includes:

obtaining, by the network side, joint indication information indicating the DMRS parameter, and the configuration information of the PRB bundling parameter; and determining, by the network side, the configuration information of the PRB bundling parameter according to the joint indication information.

In a possible implementation, the joint indication information includes any one of:

joint indication information of the DMRS parameter, and time-domain configuration information among the configuration information of the PRB bundling parameter;

joint indication information of the DMRS parameter, and frequency-domain configuration information among the configuration information of the PRB bundling parameter; and joint indication information of the DMRS parameter, and time-frequency-domain configuration information among the configuration information of the PRB bundling parameter.

In a possible implementation, after the network side determines the configuration information of the PRB bundling parameter according to the system parameter, the method further includes:

determining, by the network side, a DMRS parameter according to a binding relationship between a DRMS configuration, and the configuration information of the PRB bundling parameter.

In a possible implementation, the binding relationship includes any one of:

a preset relationship between the DMRS configuration, and frequency-domain configuration information among the configuration information of the PRB bundling parameter;

a preset relationship between the DMRS configuration, and time-domain configuration information among the configuration information of the PRB bundling parameter; and a preset relationship between the DMRS configuration, and time-frequency-domain configuration information among the configuration information of the PRB bundling parameter.

In a second aspect, an embodiment of the invention provides a network device including:

a first determining module configured to determine configuration information of a PRB bundling parameter, wherein time-domain configuration information among the configuration information of the PRB bundling parameter is configurable; and a first transmitting module configured to transmit the configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter.

In a possible implementation, the first determining module is configured:

to determine the configuration information of the PRB bundling parameter according to a system parameter; or to determine the configuration information of the PRB bundling parameter according to a DMRS parameter; or to determine the configuration information of the PRB bundling parameter according to configuration indication information.

In a possible implementation, the first determining module is configured:

to determine the configuration information of the PRB bundling parameter according to a system bandwidth; or to determine the configuration information of the PRB bundling parameter according to recommendation information transmitted by the terminal, wherein the recommendation information is generated by the terminal according to a channel measurement; or to determine the configuration information of the PRB bundling parameter according to a preset threshold.

In a possible implementation, the configuration information of the PRB bundling parameter includes at least one of followings:

a size of a PRG in the frequency domain;

a size of a PRG in the time domain; or a size of a PRG in the time-frequency domain.

In a possible implementation, the first determining module is configured:

to configure the DMRS parameter; and to determine the configuration information of the PRB bundling parameter corresponding to the DMRS parameter according to a preset correspondence relationship between the DMRS parameter and the PRB bundling parameter.

In a possible implementation, the first determining module is configured:

to determine the DMRS parameter according to the system bandwidth; and/or to determine the DMRS parameter according to recommendation information transmitted by the terminal, wherein the recommendation information is generated by the terminal according to a channel measurement; and/or to determine the DMRS parameter according to a preset threshold.

In a possible implementation, the first determining module is configured:

to determine time-domain configuration information of the PRB bundling parameter according to the DMRS parameter; and/or to determine frequency-domain configuration information of the PRB bundling parameter according to the DMRS parameter; and/or to determine time-frequency-domain configuration information of the PRB bundling parameter according to the DMRS parameter.

In a possible implementation, the first determining module is configured:

to obtain joint indication information indicating the DMRS parameter, and the configuration information of the PRB bundling parameter; and to determine the configuration information of the PRB bundling parameter according to the joint indication information.

In a possible implementation, the joint indication information includes any one of:

joint indication information of the DMRS parameter, and time-domain configuration information among the configuration information of the PRB bundling parameter;

joint indication information of the DMRS parameter, and frequency-domain configuration information among the configuration information of the PRB bundling parameter; and joint indication information of the DMRS parameter, and time-frequency-domain configuration information among the configuration information of the PRB bundling parameter.

In a possible implementation, the device further includes:
a second determining module configured to determine a DMRS parameter according to a binding relationship between a DRMS configuration, and the configuration information of the PRB bundling parameter.

In a possible implementation, the binding relationship includes any one of:
a preset relationship between the DMRS configuration, and frequency-domain configuration information among the configuration information of the PRB bundling parameter;
a preset relationship between the DMRS configuration, and time-domain configuration information among the configuration information of the PRB bundling parameter; and
a preset relationship between the DMRS configuration, and time-frequency-domain configuration information among the configuration information of the PRB bundling parameter.

In a third aspect, an embodiment of the invention provides a network device including a processor, a memory, and a transceiver, wherein the transceiver receives and transmits data under the control of the processor, the memory stores preset program, and the processor reads and executes the program in the memory:
to determine configuration information of a PRB bundling parameter, where time-domain configuration information among the configuration information of the PRB bundling parameter is configurable; and
to transmit the configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter.

In a possible implementation, the processor is configured:
to determine the configuration information of the PRB bundling parameter according to a system parameter; or to determine the configuration information of the PRB bundling parameter according to a DMRS parameter; or to determine the configuration information of the PRB bundling parameter according to configuration indication information.

In a possible implementation, the processor is configured:
to determine the configuration information of the PRB bundling parameter according to a system bandwidth; or
to determine the configuration information of the PRB bundling parameter according to recommendation information transmitted by the terminal, where the recommendation information is generated by the terminal according to a channel measurement; or
to determine the configuration information of the PRB bundling parameter according to a preset threshold.

In a possible implementation, the configuration information of the PRB bundling parameter includes at least one of followings:
a size of a PRG in the frequency domain;
a size of a PRG in the time domain; or
a size of a PRG in the time-frequency domain.

In a possible implementation, the processor is configured:
to configure the DMRS parameter; and to determine the configuration information of the PRB bundling parameter corresponding to the DMRS parameter according to a preset correspondence relationship between the DMRS parameter and the PRB bundling parameter.

In a possible implementation, the processor is configured:
to determine the DMRS parameter according to the system bandwidth; and/or
to determine the DMRS parameter according to recommendation information transmitted by the terminal, where the recommendation information is generated by the terminal according to a channel measurement; and/or
to determine the DMRS parameter according to a preset threshold.

In a possible implementation, the processor is configured:
to determine time-domain configuration information of the PRB bundling parameter according to the DMRS parameter; and/or
to determine frequency-domain configuration information of the PRB bundling parameter according to the DMRS parameter; and/or
to determine time-frequency-domain configuration information of the PRB bundling parameter according to the DMRS parameter.

In a possible implementation, the processor is configured:
to obtain joint indication information indicating the DMRS parameter, and the configuration information of the PRB bundling parameter; and to determine the configuration information of the PRB bundling parameter according to the joint indication information.

In a possible implementation, the joint indication information includes any one of:
joint indication information of the DMRS parameter, and time-domain configuration information among the configuration information of the PRB bundling parameter;
joint indication information of the DMRS parameter, and frequency-domain configuration information among the configuration information of the PRB bundling parameter; and
joint indication information of the DMRS parameter, and time-frequency-domain configuration information among the configuration information of the PRB bundling parameter.

In a possible implementation, the processor is configured to determine a DMRS parameter according to a binding relationship between a DRMS configuration, and the configuration information of the PRB bundling parameter.

In a possible implementation, the binding relationship includes any one of:
a preset relationship between the DMRS configuration, and frequency-domain configuration information among the configuration information of the PRB bundling parameter;
a preset relationship between the DMRS configuration, and time-domain configuration information among the configuration information of the PRB bundling parameter; and
a preset relationship between the DMRS configuration, and time-frequency-domain configuration information among the configuration information of the PRB bundling parameter.

In a fourth aspect, an embodiment of the invention provides a computer storage medium storing computer executable instructions configured to cause the computer to perform the method according to any one of the embodiments above of the invention.

In the technical solutions above according to the embodiments of the invention, the network side firstly determines configuration information of a PRB bundling parameter, where time-domain configuration information among the configuration information of the PRB bundling parameter is configurable; and then transmits the determined configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter. In this way, the bundling technology can be applied in both the frequency domain and the time domain, and the performance of channel estimation can be improved in the time domain and/or the frequency domain, thus addressing the drawback in the prior art that when the quality of channel estimation is improved, the flexibility and the performance may be limited, for the technical effect of further improving the quality of channel estimation.

DETAILED DESCRIPTION OF THE EMBODIMENTS

In order to make the objects, technical solutions, and advantages of the embodiments of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Figure 1:
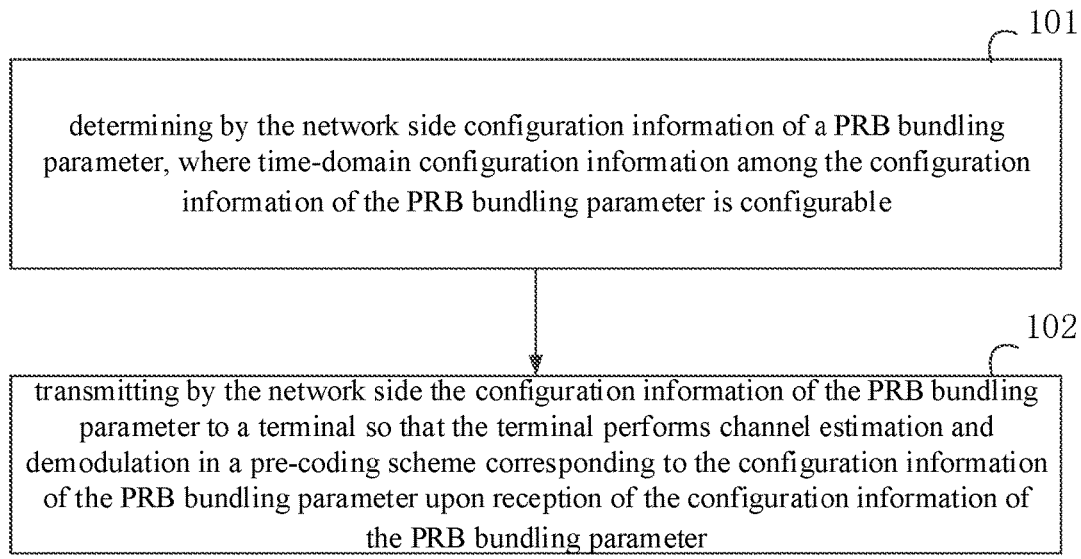
FIG. 1 is a flow chart of a method for transmitting beam-forming according to an embodiment of the invention.

As illustrated in FIG. 1, a process of transmitting beam-forming according to an embodiment of the invention is as follows.

In the step 101, the network side determines configuration information of a PRB bundling parameter, where time-domain configuration information in the configuration information of the PRB bundling parameter is configurable.

In a particular implementation, the network side particularly can be a core network or an RAN in an LTE system, and for example, the process of transmitting beam-forming is performed by a core-network control-plane function of the LTE system.

In the embodiment of the invention, there are the following three particular implementations of the step 101:

the network side determines the configuration information of the PRB bundling parameter according to a system parameter; or the network side determines the configuration information of the PRB bundling parameter according to a Demodulation Reference Signal (DMRS) parameter; or the network side determines the configuration information of the PRB bundling parameter according to configuration indication information.

The three particular implementations above will be described respectively in the following particular description.

In a first implementation, the network side determines the configuration information of the PRB bundling parameter according to a system parameter.

In the embodiment of the invention, the configuration information of the PRB bundling parameter includes one or more of:

the size of a PRG in the frequency domain;
the size of a PRG in the time domain; and
the size of a PRG in the time-frequency domain.

In a particular implementation, the system parameter particularly can be a system bandwidth, a terminal movement speed, etc., although the embodiment of the invention will not be limited thereto.

In the embodiment of the invention, the network side determines the configuration information of the PRB bundling parameter according to the system parameter in any one of the following implementations:

the network side determines the configuration information of the PRB bundling parameter according to a system bandwidth;

the network side determines the configuration information of the PRB bundling parameter according to recommendation information transmitted by the terminal, where the recommendation information is generated by the terminal according to a channel measurement; and the network side determines the configuration information of the PRB bundling parameter according to a preset threshold.

In a particular implementation, the network side will determines the size of a PRG in the frequency domain, the size of a PRG in the time domain, and the size of a PRG in the time-frequency domain respectively as described below in details, for example.

a) The network side determines the size of a PRG in the frequency domain:

in a first implementation, the network side determines the size of a PRG in the frequency domain according to a system bandwidth (there is a default correspondence relationship between the size of a PRG in the frequency domain, and the system bandwidth);

in a second implementation, the terminal recommends the size of a PRG in the frequency domain for the network side according to its channel measurement; and in a third implementation, the network side determines the size of a PRG in the frequency domain directly according to a preset threshold.

b) The network side determines the size of a PRG in the time domain:

in a first implementation, the network side determines the size of a PRG in the time domain according to a system bandwidth, a movement speed, or the number of consecutive time units for resource scheduling (there is a default correspondence relationship between the size of a PRG in the time domain, and the system bandwidth, the movement speed, or the number of consecutive time units for resource scheduling);

in a second implementation, the terminal recommends the size of a PRG in the time domain for the network side according to its channel measurement; and in a third implementation, the network side determines the size of a PRG in the time domain directly according to a preset threshold.

c) The network side determines the size of a PRG in the time-frequency domain:

in a first implementation, the network side determines the size of a PRG in the time-frequency domain according to a system bandwidth, a movement speed, or the number of consecutive time and frequency units for resource scheduling (there is a default correspondence relationship between the size of a PRG in the time domain, and the system bandwidth, the movement speed, or the number of consecutive time and frequency units for resource scheduling);

in a second implementation, the terminal recommends the size of a PRG in the time-frequency domain for the network side according to its channel measurement; and in a third implementation, the network side determines the size of a PRG in the time-frequency domain directly according to a preset threshold.

In a particular implementation, the network side can determine the three parameters above according to a configuration or a system default value, where in the second implementation, the terminal can measure a channel by measuring a movement speed, a Doppler spread, a Doppler shift, a delay spread, an attainable throughput, a predicated error probability, or another parameter, and further recommend the parameters for the network side according to a measurement result; and in the third implementation, the network side can preset the preset threshold, and then specify the configuration parameters according to the preset threshold, or the network side can determine the preset threshold according to a movement speed, a Doppler spread, a Doppler shift, a delay spread, an attainable throughput, a predicated error probability, or another parameter, and then further specify the three parameters above according to the determined preset threshold, and those skilled in the art can make a decision as needed in reality.

Correspondingly, after the network side determines the configuration information of the PRB bundling parameter according to the system parameter, the method further includes:

the network side determines a DMRS parameter according to a binding relationship between a DRMS configuration, and the configuration information of the PRB bundling parameter.

In the embodiment of the invention, the binding relationship includes any one of:

a preset relationship between the DMRS configuration, and frequency-domain configuration information among the configuration information of the PRB bundling parameter;

a preset relationship between the DMRS configuration, and time-domain configuration information among the configuration information of the PRB bundling parameter; and a preset relationship between the DMRS configuration, and time-frequency-domain configuration information among the configuration information of the PRB bundling parameter.

In a particular implementation, in order to simplify a system design, after the network side determines the PRB bundling parameter, the network side can further configure the DMRS parameter according to the preset binding relationship between a DRMS configuration and a PRB bundling configuration. For example, a prescribed relationship between a PRB bundling frequency-domain configuration and a DRMS parameter configuration can be pre B bundling frequency-domain configuration. Of course, alternatively there may be a prescribed relationship between a PRB bundling time-domain configuration and a DMRS parameter configuration, or a prescribed relationship between a PRB bundling time-frequency-domain configuration and a DMRS parameter configuration, although the embodiment of the invention will not be limited thereto.

Of course, after the PRB bundling parameter is determined, the network side can alternatively transmit the determined parameter directly to the terminal, and at this time, the binding relationship between the DMRS configuration and the PRB bundling configuration can be preset in the terminal, so the terminal can configure the DMRS configuration according to the PRB bundling parameter upon reception of the PRB bundling parameter, particularly in the same way as in the method above, so a repeated description thereof will be omitted here.

Correspondingly after the step 101 is performed, the network side performs the step 102 in which the network side transmits the configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter.

In a particular implementation, after the configuration information is determined, the network side determines whether the terminal can obtain the configuration information implicitly from the system parameter, and if not, the network side will notify the terminal of the configuration information of the PRB bundling parameter via broadcast or common or dedicated control signaling so that the terminal configures accordingly. For example, the network side transmits the size of a PRG in the time domain to the terminal, and after the terminal configures accordingly, the terminal applies the same pre-coding to several consecutive PRBs in the time domain (the number of which is determined by the size of a PRG in the time domain) in channel estimation and demodulation. The network side will transmit the size of a PRG in the frequency domain and/or the size of a PRG in the time-frequency domain and/or the DMRS parameter to the terminal in the same process as described above, so a repeated description thereof will be omitted here.

In a second implementation, the network side determines the configuration information of the PRB bundling parameter according to a DMRS parameter.

In the embodiment of the invention, the network side determines the configuration information of the PRB bundling parameter according to a DMRS parameter as follows:

the network side configures the DMRS parameter; and the network side determines the configuration information of the PRB bundling parameter corresponding to the DMRS parameter according to a preset correspondence relationship between the DMRS parameter and the PRB bundling parameter.

In a particular implementation, the network side can firstly configure the DMRS parameter, and then further determine the PRB bundling configuration parameter according to the binding relationship.

In the embodiment of the invention, the network side determines the DMRS parameter in any one of the following implementations:

the network side determines the DMRS parameter according to the system bandwidth;

the network side determines the DMRS parameter according to recommendation information transmitted by the terminal, where the recommendation information is generated by the terminal according to a channel measurement; and the network side determines the DMRS parameter according to a preset threshold.

In a particular implementation, the network side can determine the DMRS parameter according to a configuration or a system default value, where in the implementation in which the network side configures the DMRS parameter according to the recommendation information transmitted by the terminal, the terminal can measure a channel by measuring a movement speed, a Doppler spread, a Doppler shift, a delay spread, an attainable throughput, a predicated error probability, or another parameter, and further recommend the DMRS parameter for the network side according to a measurement result; and in the network side configures the DMRS parameter according to the preset threshold, the network side can preset the preset threshold, and then configure the DMRS parameter directly according to the preset threshold, or the network side can determine the preset threshold according to a movement speed, a Doppler spread, a Doppler shift, a delay spread, an attainable throughput, a predicated error probability, or another parameter, and then further specify the DMRS parameter according to the determined preset threshold, and those skilled in the art can make a decision as needed in reality.

In the embodiment of the invention, the network side determines the configuration information of the PRB bundling parameter corresponding to the DMRS parameter in one or more of the following implementations:

the network side determines time-domain configuration information of the PRB bundling parameter according to the DMRS parameter;

the network side determines frequency-domain configuration information of the PRB bundling parameter according to the DMRS parameter; and the network side determines time-frequency-domain configuration information of the PRB bundling parameter according to the DMRS parameter.

Correspondingly after the step 101 is performed, the network side performs the step 102 in which the network side transmits the configuration information of the PRB bundling parameter to the terminal so that the terminal performs channel estimation and demodulation in a pre-coding scheme corresponding to the configuration information of the PRB bundling parameter upon reception of the configuration information of the PRB bundling parameter.

In a particular implementation, after the configuration information is determined, the network side determines whether the terminal can obtain the configuration information implicitly from the system parameter, and if not, the network side will notify the terminal of the configuration information of the PRB bundling parameter via broadcast or common or dedicated control signaling so that the terminal configures accordingly. For example, the network side transmits the size of a PRG in the time domain to the terminal, and after the terminal configures accordingly, the terminal applies the same pre-coding to several consecutive PRBs in the time domain (the number of which is determined by the size of a PRG in the time domain) in channel estimation and demodulation. The network side will transmit the size of a PRG in the frequency domain and/or the size of a PRG in the time-frequency domain and/or the DMRS parameter to the terminal in the same process as described above, so a repeated description thereof will be omitted here.

In a third implementation, the network side determines the configuration information of the PRB bundling parameter according to configuration indication information.

In the embodiment of the invention, the network side determines the configuration information of the PRB bundling parameter according to configuration indication information as follows:

the network side obtains joint indication information indicating the DMRS parameter, and the configuration information of the PRB bundling parameter; and the network side determines the configuration information of the PRB bundling parameter according to the joint indication information.

Particularly the joint indication information includes any one of:

joint indication information of the DMRS parameter, and time-domain configuration information in the configuration information of the PRB bundling parameter;

joint indication information of the DMRS parameter, and frequency-domain configuration information in the configuration information of the PRB bundling parameter; and joint indication information of the DMRS parameter, and time-frequency-domain configuration information in the configuration information of the PRB bundling parameter.

In a particular implementation, the network side determines the DMRS parameter and the PRB bundling parameter directly according to the received indication information. The indication information can be joint indication information of DMRS and PRB bundling time-domain configurations, or can be joint indication information of DMRS and PRB bundling frequency-domain configurations, or can be joint indication information of DMRS and PRB bundling time-frequency-domain configurations.

Correspondingly after the step 101 is performed, the network side performs the step 102 in which the network side transmits the configuration information of the PRB bundling parameter to the terminal so that the terminal performs channel estimation and demodulation in a pre-coding scheme corresponding to the configuration information of the PRB bundling parameter upon reception of the configuration information of the PRB bundling parameter.

In a particular implementation, after the configuration information is determined, the network side determines whether the terminal can obtain the configuration information implicitly from the system parameter, and if not, the network side will notify the terminal of the configuration information of the PRB bundling parameter via broadcast or common or dedicated control signaling so that the terminal configures accordingly. For example, the network side transmits the size of a PRG in the time domain to the terminal, and after the terminal configures accordingly, the terminal applies the same pre-coding to several consecutive PRBs in the time domain (the number of which is determined by the size of a PRG in the time domain) in channel estimation and demodulation. The network side will transmit the size of a PRG in the frequency domain and/or the size of a PRG in the time-frequency domain and/or the DMRS parameter to the terminal in the same process as described above, so a repeated description thereof will be omitted here.

Figure 2:
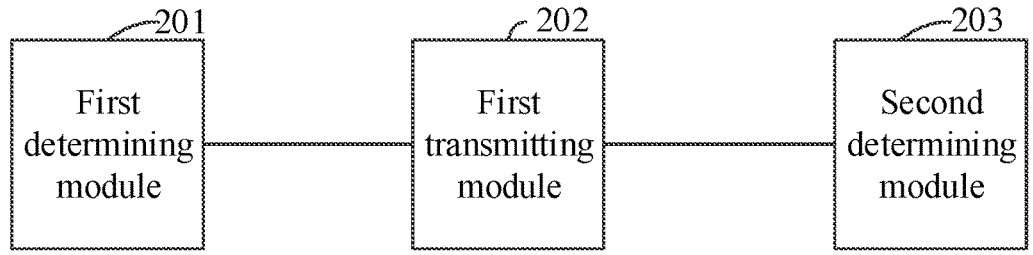
FIG. 2 is a structural block diagram of a network device according to an embodiment of the invention.

Based upon the same inventive idea, an embodiment of the invention provides a network device, and reference can be made to the description of the method embodiment for a particular implementation of the network device, so a repeated description thereof will be omitted here; and as illustrated in FIG. 2, the network device generally includes:

a first determining module 201 configured to determine configuration information of a PRB bundling parameter, where time-domain configuration information in the configuration information of the PRB bundling parameter is configurable; and a first transmitting module 202 configured to transmit the configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter.

In a possible implementation, the first determining module 201 is configured:

to determine the configuration information of the PRB bundling parameter according to a system parameter; or to determine the configuration information of the PRB bundling parameter according to a DMRS parameter; or to determine the configuration information of the PRB bundling parameter according to configuration indication information.

In a possible implementation, the first determining module 201 is configured:

to determine the configuration information of the PRB bundling parameter according to a system bandwidth; or to determine the configuration information of the PRB bundling parameter according to recommendation information transmitted by the terminal, where the recommendation information is generated by the terminal according to a channel measurement; or to determine the configuration information of the PRB bundling parameter according to a preset threshold.

In a possible implementation, the configuration information of the PRB bundling parameter includes one or more of:
the size of a PRG in the frequency domain;
the size of a PRG in the time domain; and
the size of a PRG in the time-frequency domain.

In a possible implementation, the first determining module 201 is configured:
to configure the DMRS parameter; and
to determine the configuration information of the PRB bundling parameter corresponding to the DMRS parameter according to a preset correspondence relationship between the DMRS parameter and the PRB bundling parameter.

In a possible implementation, the first determining module 201 is configured:
to determine the DMRS parameter according to the system bandwidth; and/or
to determine the DMRS parameter according to recommendation information transmitted by the terminal, where the recommendation information is generated by the terminal according to a channel measurement; and/or
to determine the DMRS parameter according to a preset threshold.

In a possible implementation, the first determining module 201 is configured:
to determine time-domain configuration information of the PRB bundling parameter according to the DMRS parameter; and/or
to determine frequency-domain configuration information of the PRB bundling parameter according to the DMRS parameter; and/or
to determine time-frequency-domain configuration information of the PRB bundling parameter according to the DMRS parameter.

In a possible implementation, the first determining module 201 is configured:
to obtain joint indication information indicating the DMRS parameter, and the configuration information of the PRB bundling parameter; and
to determine the configuration information of the PRB bundling parameter according to the joint indication information.

In a possible implementation, the joint indication information includes any one of:
joint indication information of the DMRS parameter, and time-domain configuration information among the configuration information of the PRB bundling parameter;
joint indication information of the DMRS parameter, and frequency-domain configuration information among the configuration information of the PRB bundling parameter; and
joint indication information of the DMRS parameter, and time-frequency-domain configuration information among the configuration information of the PRB bundling parameter.

In a possible implementation, the device further includes:
a second determining module 203 configured to determine a DMRS parameter according to a binding relationship between a DRMS configuration, and the configuration information of the PRB bundling parameter.

In a possible implementation, the binding relationship includes any one of:
a preset relationship between the DMRS configuration, and frequency-domain configuration information among the configuration information of the PRB bundling parameter;
a preset relationship between the DMRS configuration, and time-domain configuration information among the configuration information of the PRB bundling parameter; and
a preset relationship between the DMRS configuration, and time-frequency-domain configuration information among the configuration information of the PRB bundling parameter.

Figure 3:
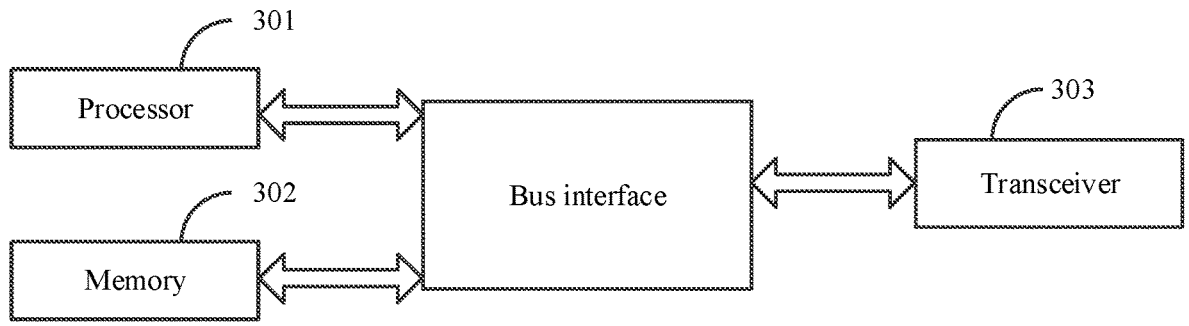
FIG. 3 is a structural block diagram of another network device according to an embodiment of the invention.

Based upon the same inventive idea, an embodiment of the invention provides a network device, and reference can be made to the description of the method embodiment for a particular implementation of the network device, so a repeated description thereof will be omitted here; and as illustrated in FIG. 3, the network device generally includes a processor 301, a memory 302, and a transceiver 303, where the transceiver 303 receives and transmits data under the control of the processor 301, the memory 302 stores preset program, and the processor 301 reads and executes the program in the memory 302:
to determine configuration information of a PRB bundling parameter, where time-domain configuration information among the configuration information of the PRB bundling parameter is configurable; and
to transmit the configuration information of the PRB bundling parameter to a terminal through the transceiver 303 so that the terminal performs channel estimation and demodulation in a pre-coding scheme corresponding to the configuration information of the PRB bundling parameter upon reception of the configuration information of the PRB bundling parameter.

Here in FIG. 3, the bus architecture can include any number of interconnecting buses and bridges to particularly link together various circuits including one or more processors represented by the processor 301, and one or more memories represented by the memory 302. The bus architecture can further link together various other circuits, e.g., a peripheral device, a manostat, a power management circuit, etc., all of which are well known in the art, so a further description thereof will be omitted in this context. The bus interface serves as an interface. The transceiver 303 can be a number of elements, e.g., a transmitter and a receiver, which are units for communication with various other devices over a transmission medium. The processor 301 is responsible for managing the bus architecture and performing normal processes, and the memory 302 can store data for use by the processor 301 in performing the operations.

In a possible implementation, the processor 301 is configured: to determine the configuration information of the PRB bundling parameter according to a system parameter; or to determine the configuration information of the PRB bundling parameter according to a DMRS parameter; or to determine the configuration information of the PRB bundling parameter according to configuration indication information.

In a possible implementation, the processor 301 is configured:
to determine the configuration information of the PRB bundling parameter according to a system bandwidth; or
to determine the configuration information of the PRB bundling parameter according to recommendation information transmitted by the terminal, where the recommendation information is generated by the terminal according to a channel measurement; or to determine the configuration information of the PRB bundling parameter according to a preset threshold.

In a possible implementation, the configuration information of the PRB bundling parameter includes one or more of:
the size of a PRG in the frequency domain;
the size of a PRG in the time domain; and
the size of a PRG in the time-frequency domain.

In a possible implementation, the processor 301 is configured: to configure the DMRS parameter; and to determine the configuration information of the PRB bundling parameter corresponding to the DMRS parameter according to a preset correspondence relationship between the DMRS parameter and the PRB bundling parameter.

In a possible implementation, the processor 301 is configured:
to determine the DMRS parameter according to the system bandwidth; and/or
to determine the DMRS parameter according to recommendation information transmitted by the terminal, where the recommendation information is generated by the terminal according to a channel measurement; and/or
to determine the DMRS parameter according to a preset threshold.

In a possible implementation, the processor 301 is configured:
to determine time-domain configuration information of the PRB bundling parameter according to the DMRS parameter; and/or
to determine frequency-domain configuration information of the PRB bundling parameter according to the DMRS parameter; and/or
to determine time-frequency-domain configuration information of the PRB bundling parameter according to the DMRS parameter.

In a possible implementation, the processor 301 is configured: to obtain joint indication information indicating the DMRS parameter, and the configuration information of the PRB bundling parameter; and to determine the configuration information of the PRB bundling parameter according to the joint indication information.

In a possible implementation, the joint indication information includes any one of:
joint indication information of the DMRS parameter, and time-domain configuration information among the configuration information of the PRB bundling parameter;
joint indication information of the DMRS parameter, and frequency-domain configuration information among the configuration information of the PRB bundling parameter; and
joint indication information of the DMRS parameter, and time-frequency-domain configuration information among the configuration information of the PRB bundling parameter.

In a possible implementation, the processor 301 is configured to determine a DMRS parameter according to a binding relationship between a DRMS configuration, and the configuration information of the PRB bundling parameter.

In a possible implementation, the binding relationship includes any one of:
a preset relationship between the DMRS configuration, and frequency-domain configuration information among the configuration information of the PRB bundling parameter;
a preset relationship between the DMRS configuration, and time-domain configuration information among the configuration information of the PRB bundling parameter; and
a preset relationship between the DMRS configuration, and time-frequency-domain configuration information among the configuration information of the PRB bundling parameter.

The processor 301 can be a Central Processing Unit (CPU), an Application Specific Integrated Circuit (ASIC), a Field-Programmable Gate Array (FPGA), or a Complex Programmable Logic Device (CPLD).

An embodiment of the invention provides a computer storage medium configured to store computer program instructions to be executed by the device or the network device according to the embodiments above of the invention, where the computer program instructions include program for performing the method according to any one of the embodiments above of the invention.

The computer storage medium can be any computer accessible available medium or data storage device including but not limited to a magnetic memory (e.g., a floppy disk, a hard disk, a magnetic tape, a Magnetic-Optical (MO) disk, etc.), an optical memory (e.g., a CD, a DVD, a BD, an HVD, etc.), a semiconductor memory (e.g., an ROM, an EPROM, an EEPROM, a nonvolatile memory (NAND FLASH), a Solid State Disk (SSD), etc.), etc.

In the technical solutions above according to the embodiments of the invention, the network side firstly determines configuration information of a PRB bundling parameter, where time-domain configuration information among the configuration information of the PRB bundling parameter is configurable; and then transmits the determined configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter. In this way, the bundling technology can be applied in both the frequency domain and the time domain, and the performance of channel estimation can be improved in the time domain and/or the frequency domain, thus addressing the drawback in the prior art that when the quality of channel estimation is improved, the flexibility and the performance may be limited, for the technical effect of further improving the quality of channel estimation.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A beam forming and transmission method, comprising:
    determining, by a network side, configuration information of a Physical Resource Block (PRB) bundling parameter, wherein time-domain configuration information in the configuration information of the PRB bundling parameter is configurable; and
    transmitting, by the network side, the configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter;
    wherein determining, by the network side, the configuration information of the PRB bundling parameter comprises:
    determining, by the network side, the configuration information of the PRB bundling parameter according to a system parameter, the system parameter comprises a terminal movement speed or a quantity of consecutive time units for resource scheduling; or
    determining, by the network side, the configuration information of the PRB bundling parameter according to a Demodulation Reference Signal (DMRS) parameter, the DMRS parameter is configured according to recommendation information transmitted by the terminal; or
    determining, by the network side, the configuration information of the PRB bundling parameter according to configuration indication information, the configuration indication information comprises joint indication information indicating the DMRS parameter, and the configuration information of the PRB bundling parameter.

2. The method according to claim 1, wherein determining, by the network side, the configuration information of the PRB bundling parameter according to the system parameter comprises:
    determining, by the network side, the configuration information of the PRB bundling parameter according to a system bandwidth; or
    determining, by the network side, the configuration information of the PRB bundling parameter according to recommendation information transmitted by the terminal, wherein the recommendation information is generated by the terminal according to a channel measurement; or
    determining, by the network side, the configuration information of the PRB bundling parameter according to a preset threshold;
    wherein the configuration information of the PRB bundling parameter comprises at least one of followings:
    a size of a Pre-coding Resource block Group (PRG) in the frequency domain;
    a size of a PRG in the time domain; or
    a size of a PRG in the time-frequency domain.

3. The method according to claim 1, wherein determining, by the network side, the configuration information of the PRB bundling parameter according to the DMRS parameter comprises:
    configuring, by the network side, the DMRS parameter; and
    determining, by the network side, the configuration information of the PRB bundling parameter corresponding to the DMRS parameter according to a preset correspondence relationship between the DMRS parameter and the PRB bundling parameter.

4. The method according to claim 3, wherein configuring, by the network side, the DMRS parameter comprises at least one of followings:
    determining, by the network side, the DMRS parameter according to the system bandwidth;
    determining, by the network side, the DMRS parameter according to recommendation information transmitted by the terminal, wherein the recommendation information is generated by the terminal according to a channel measurement; or
    determining, by the network side, the DMRS parameter according to a preset threshold.

5. The method according to claim 4, wherein determining the configuration information of the PRB bundling parameter corresponding to the DMRS parameter comprises at least one of followings:
    determining time-domain configuration information of the PRB bundling parameter according to the DMRS parameter;
    determining frequency-domain configuration information of the PRB bundling parameter according to the DMRS parameter; or
    determining time-frequency-domain configuration information of the PRB bundling parameter according to the DMRS parameter.

6. The method according to claim 1, wherein determining, by the network side, the configuration information of the PRB bundling parameter according to the configuration indication information comprises:

obtaining, by the network side, joint indication information indicating the DMRS parameter, and the configuration of the PRB bundling parameter; and determining, by the network side, the configuration information of the PRB bundling parameter according to the joint indication information.

7. The method according to claim 6, wherein the joint indication information comprises at least one of followings:

joint indication information of the DMRS parameter, and time-domain configuration information among the configuration information of the PRB bundling parameter;

joint indication information of the DMRS parameter, and frequency-domain configuration information among the configuration information of the PRB bundling parameter; or joint indication information of the DMRS parameter, and time-frequency-domain configuration information among the configuration information of the PRB bundling parameter.

8. The method according to claim 1, wherein after determining by the network side the configuration information of the PRB bundling parameter according to the system parameter, the method further comprises:

determining, by the network side, a DMRS parameter according to a binding relationship between a DRMS configuration, and the configuration information of the PRB bundling parameter.

9. The method according to claim 8, wherein the binding relationship comprises any one of:

a preset relationship between the DMRS configuration, and frequency-domain configuration information among the configuration information of the PRB bundling parameter;

a preset relationship between the DMRS configuration, and time-domain configuration information among the configuration information of the PRB bundling parameter; and a preset relationship between the DMRS configuration, and time-frequency-domain configuration information among the configuration information of the PRB bundling parameter.

10. A network device, comprising:

a memory configured to store program instructions; and a processor configured to execute the program instructions stored in the memory:

to determine configuration information of a PRB bundling parameter, wherein time-domain configuration information among the configuration information of the PRB bundling parameter is configurable; and to transmit the configuration information of the PRB bundling parameter to a terminal so that the terminal performs channel estimation and demodulation in a pre-coding scheme corresponding to the configuration information of the PRB bundling parameter upon reception of the configuration information of the PRB bundling parameter;

wherein the processor is configured to execute the program instructions stored in the memory to determine the configuration information of the PRB bundling parameter by:

determining the configuration information of the PRB bundling parameter according to a system parameter, the system parameter comprises a terminal movement speed or a quantity of consecutive time units for resource scheduling; or determining the configuration information of the PRB bundling parameter according to a DMRS parameter, the DMRS parameter is configured according to recommendation information transmitted by the terminal; or determining the configuration information of the PRB bundling parameter according to configuration indication information, the configuration indication information comprises joint indication information indicating the DMRS parameter, and the configuration information of the PRB bundling parameter.

11. The network device according to claim 10, wherein the processor is configured to execute the program instructions stored in the memory to determine the configuration information of the PRB bundling parameter according to a system parameter by:

determining the configuration information of the PRB bundling parameter according to a system bandwidth; or determining the configuration information of the PRB bundling parameter according to recommendation information transmitted by the terminal, wherein the recommendation information is generated by the terminal according to a channel measurement; or determining the configuration information of the PRB bundling parameter according to a preset threshold;

wherein the configuration information of the PRB bundling parameter comprises at least one of followings:

a size of a PRG in the frequency domain;
a size of a PRG in the time domain; or
a size of a PRG in the time-frequency domain.

12. The network device according to claim 10, wherein the processor is configured to execute the program instructions stored in the memory to determine the configuration information of the PRB bundling parameter according to a DMRS parameter by:

configuring the DMRS parameter; and determining the configuration information of the PRB bundling parameter corresponding to the DMRS parameter according to a preset correspondence relationship between the DMRS parameter and the PRB bundling parameter.

13. The network device according to claim 12, wherein the processor is configured to execute the program instructions stored in the memory to configure the DMRS parameter by at least one of followings:

determining the DMRS parameter according to the system bandwidth;

determining the DMRS parameter according to recommendation information transmitted by the terminal, wherein the recommendation information is generated by the terminal according to a channel measurement; or determining the DMRS parameter according to a preset threshold.

14. The network device according to claim 13, wherein the processor is configured to execute the program instructions stored in the memory to determine the configuration information of the PRB bundling parameter corresponding to the DMRS parameter by at least one of followings:

determining time-domain configuration information of the PRB bundling parameter according to the DMRS parameter;

determining frequency-domain configuration information of the PRB bundling parameter according to the DMRS parameter; or determining time-frequency-domain configuration information of the PRB bundling parameter according to the DMRS parameter.

15. The network device according to claim 10, wherein the processor is configured to execute the program instructions stored in the memory to determine the configuration information of the PRB bundling parameter according to configuration indication information by:
    obtaining joint indication information indicating the DMRS parameter, and the configuration information of the PRB bundling parameter; and
    determining the configuration information of the PRB bundling parameter according to the joint indication information.

16. The network device according to claim 15, wherein the joint indication information comprises any one of:
    joint indication information of the DMRS parameter, and time-domain configuration information among the configuration information of the PRB bundling parameter;
    joint indication information of the DMRS parameter, and frequency-domain configuration information among the configuration information of the PRB bundling parameter; and
    joint indication information of the DMRS parameter, and time-frequency-domain configuration information among the configuration information of the PRB bundling parameter.

17. The network device according to claim 10, wherein after determining the configuration information of the PRB bundling parameter according to a system parameter, the processor is configured to execute the program instructions stored in the memory to:
    determine a DMRS parameter according to a binding relationship between a DRMS configuration, and the configuration information of the PRB bundling parameter.

18. The network device according to claim 17, wherein the binding relationship comprises any one of:
    a preset relationship between the DMRS configuration, and frequency-domain configuration information among the configuration information of the PRB bundling parameter;
    a preset relationship between the DMRS configuration, and time-domain configuration information among the configuration information of the PRB bundling parameter; and
    a preset relationship between the DMRS configuration, and time-frequency-domain configuration information among the configuration information of the PRB bundling parameter.

\* \* \* \* \*